UNITED STATES PATENT OFFICE.

JOHN VON GLAHN, OF BROOKLYN, NEW YORK.

PROCESS FOR AGING ALCOHOLIC LIQUIDS.

1,265,838.  Specification of Letters Patent.  Patented May 14, 1918.

No Drawing.  Application filed October 9, 1914. Serial No. 865,798.

*To all whom it may concern:*

Be it known that I, JOHN VON GLAHN, a citizen of the United States, and a resident of the borough of Brooklyn, city of New York, in the county of Kings and State of New York, have invented certain new and useful Improvements in Processes for Aging Alcoholic Liquids, of which the following is a specification.

My invention relates to the aging of alcoholic liquids and refers particularly to a method by which whisky, wines, liquors, cordials and similar liquids may be aged quickly, thoroughly and economically.

During the distillation and production of alcoholic beverages a number of injurious and objectionable compounds are formed, the elimination of which is necessary in order that the beverage may be of such a composition as to appeal to the taste of the consumer and to allow of its consumption without undue injurious effects.

The compounds thus formed comprise a great number of products, among those formed in the largest quantities and possessing the most objectionable features being the higher alcohols known under the name of fusel oils.

The necessity of eliminating these fusel oils has long been known and numerous suggestions have been made for removing them or transforming them into less objectionable and more advantageous compounds.

Their removal by distillation has been found to be impractical and the method usually adopted is to allow the liquid, in which they are contained, to stand for a very considerable length of time, usually from four to six years, in a temperature not exceeding 115° F. During this period the liquid is aged and the fusel oils are gradually changed into etheric compounds free from the deleterious effects of the oils and possessing peculiar tastes and odors which give to the finished product its characteristics.

This process has many commercially objectionable features. It requires the production and retention of enormous stocks with the incident expense of invested capital in goods and storage charges, and the uncertainty of the rapidity of the reactions renders it impossible to definitely judge the amount that may be obtained in the desired condition at any particular time.

It is evident that a method of aging that will eliminate the retaining of the products for so long a time and that will produce a conversion of the fusel oils uniformly and thoroughly will be of the greatest value. Numerous methods for accomplishing this have been suggested but none of them has met with general adoption, as for various reasons they have been found to lack the necessary requisites of commercial application.

My invention for aging beverages of this character overcomes the present known difficulties and allows of their complete and proper aging within a short time and under conditions that permit of its commercial use.

Among the advantages of my invention are the short length of time required for its successful use, two or three weeks, obviation of expensive apparatus, ordinary vats being the only necessary containers, the exceedingly low cost of the materials used which can be re-used practically continually, and the completeness of the conversion of the objectionable bodies into desirable ones.

My invention comprises broadly the treatment of the alcoholic beverage with a mixture of carbon and cellulose in the presence of an aged alcoholic liquid at practically the ordinary temperature and for a short period of time.

I have found that if whisky, or other alcoholic beverages, containing fusel oil and other objectionable distillate bodies, be allowed to remain in contact with a considerable amount of carbon and cellulose in the presence of an aged alcoholic liquid at a temperature not exceeding 115° F. for two or three weeks, the fusel oil and other indicated bodies will be converted into etheric and other compounds having valuable properties and that the results obtained thereby have the same general characteristics and properties as those obtained by the present method of aging for several years.

The carbon may be in any form but I prefer to use coke or charcoal in a finely divided condition, and the cellulose may be in any form but I prefer to use wood in the form of sawdust, chips or other finely divided condition.

I use the words "aged liquids" and "aged whisky" in their ordinary commercial sense and refer to alcoholic liquids and whisky in which the fusel oils and similar products formed in the process of manufacture have been converted into their etheric or similar compounds.

The following is one method of employing my method in the aging of an alcoholic beverage: Two parts by volume of oak sawdust are thoroughly mixed with 8 parts by volume of finely divided oak charcoal, 100 parts by volume of unaged or raw whisky are poured upon 35 parts by volume of the above mixture in the presence of aged whisky and the ingredients allowed to thus remain in contact with each other until all of the fusel oils have been converted. The length of time necessary for this aging process varies with the temperature of the mixture and the character of the raw whisky, but I have found that the process is generally accomplished in two weeks at a temperature of 110° F. When the operation is completed, the aged whisky is drawn off from the insoluble ingredients by decantation or otherwise and a new quantity of raw whisky added to this remaining mixture of sawdust and charcoal and treated in the same manner.

I have found that the same amount of charcoal and sawdust may be used repeatedly without any evident loss in their aging powers.

The higher the temperature the more rapid is the reaction, but it is advisable that it should not be allowed to exceed 115° F.

An increased quantity of the carbon and cellulose also accelerates the reaction and shortens the period of time necessary for the complete carrying out of my process.

It will thus be seen that by my process, whisky may be aged extremely economically as the time of treatment is short, no special expensive machinery is necessary, and the material employed is capable of continual use.

I do not limit myself to the described or mentioned beverages or materials, nor to the temperatures, times or quantities, all of which may be varied without going beyond the scope of my invention as described and claimed.

What is claimed is:

1. A process for rapidly aging alcoholic liquids containing fusel oils which comprises impregnating finely divided wood with an aged alcoholic liquid and allowing the unaged alcoholic liquid to remain in intimate contact with the impregnated wood, and finely divided charcoal.

2. A process for rapidly aging alcoholic liquids containing fusel oils, which comprises allowing the alcoholic liquid to remain in contact for a protracted period with a mixture of finely divided oak wood and charcoal in the presence of aged liquid.

3. A process for rapidly aging raw whisky, which comprises allowing the raw whisky to remain in contact for a protracted period with a mixture of wood containing aged whisky and charcoal.

4. A process for rapidly aging raw whisky, which comprises allowing the raw whisky to remain in contact for a protracted period with a mixture of finely divided oak wood and charcoal in the presence of aged whisky.

Signed at New York city in the county of New York and State of New York, this 3rd day of October 1914.

JOHN VON GLAHN.

Witnesses:
 WALTER L. POST,
 EDW. RANDOLPH WALTON, Jr.